US012495106B2

(12) United States Patent
Yun et al.

(10) Patent No.: US 12,495,106 B2
(45) Date of Patent: Dec. 9, 2025

(54) ELECTRONIC DEVICE COMPRISING AN ANTENNA

(71) Applicant: Samsung Electronics Co., Ltd., Suwon-si (KR)

(72) Inventors: Sumin Yun, Suwon-si (KR); Hosaeng Kim, Suwon-si (KR); Kookjoo Lee, Suwon-si (KR); Jaehoon Jo, Suwon-si (KR); Jaebong Chun, Suwon-si (KR); Jinwoo Jung, Suwon-si (KR); Hochul Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 434 days.

(21) Appl. No.: 18/131,784

(22) Filed: Apr. 6, 2023

(65) Prior Publication Data
US 2023/0247121 A1 Aug. 3, 2023

Related U.S. Application Data

(63) Continuation of application No. PCT/KR2021/013025, filed on Sep. 24, 2021.

(30) Foreign Application Priority Data

Oct. 7, 2020 (KR) .................. 10-2020-0129608

(51) Int. Cl.
H04B 1/40 (2015.01)
H01Q 1/24 (2006.01)
(Continued)

(52) U.S. Cl.
CPC .......... H04M 1/0266 (2013.01); H01Q 1/243 (2013.01); H01Q 1/38 (2013.01); H04B 1/0053 (2013.01); H04M 1/22 (2013.01)

(58) Field of Classification Search
CPC ...... H04M 1/0266; H04M 1/22; H04M 1/026; H04M 2201/34; H04B 1/0053;
(Continued)

(56) References Cited

U.S. PATENT DOCUMENTS 10,028,045 B1 * 7/2018 Saini ..................... G06F 1/1626
10,326,196 B2   6/2019 Kim et al.
(Continued)

FOREIGN PATENT DOCUMENTS

CN 108539386 B 2/2020
JP 11177336 A 7/1999
(Continued)

OTHER PUBLICATIONS

Notice of Preliminary Rejection Issued In KR Application No. 10-2020-0129608; Mail Date Oct. 4, 2024; 09 Pages.

Primary Examiner — Andrew Wendell
(74) Attorney, Agent, or Firm — CANTOR COLBURN LLP

(57) ABSTRACT

An electronic device includes a display having a plurality of layers; a conductive mesh pattern disposed on a first layer among the plurality of layers and formed adjacent to a first edge of the display; a feeding line connecting from the first edge to the conductive mesh pattern; and a wireless communication circuit electrically connected to the feeding line and feeding electricity to the conductive mesh pattern through the feeding line, wherein the first layer includes the conductive mesh pattern and a dummy pattern in a first area in an area surrounding the conductive mesh pattern, the first area corresponding to an area between the conductive mesh pattern and the first edge, the dummy pattern being spaced apart from the feeding line, and the first layer does not
(Continued)

include a conductive pattern in a second area remaining after excluding the first area from the area surrounding the conductive mesh pattern.

20 Claims, 15 Drawing Sheets

(51) Int. Cl.
*H01Q 1/38* (2006.01)
*H04B 1/00* (2006.01)
*H04M 1/02* (2006.01)
*H04M 1/22* (2006.01)

(58) Field of Classification Search
CPC ... H04B 1/03; H04B 1/04; H04B 1/08; H04B 1/16; H04B 1/40; H01Q 1/243; H01Q 1/38; H01Q 1/44; H01Q 1/46
See application file for complete search history.

(56) References Cited

U.S. PATENT DOCUMENTS

| | | |
|---|---|---|
| 10,401,548 B2 | 9/2019 | Chai et al. |
| 10,524,356 B2 | 12/2019 | Tombs |
| 10,998,609 B2 | 5/2021 | Tsuchiya et al. |
| 11,316,264 B2 | 4/2022 | Ryu et al. |
| 11,322,825 B2 | 5/2022 | Oh et al. |
| 11,340,722 B2 | 5/2022 | Oh et al. |
| 11,342,686 B2 | 5/2022 | Kim et al. |
| 2003/0080903 A1* | 5/2003 | Chen .................. H01Q 9/285 343/702 |
| 2013/0147573 A1* | 6/2013 | Yamamoto ............ H01Q 1/007 333/12 |
| 2016/0103535 A1* | 4/2016 | Hu ....................... G06F 3/0412 345/174 |
| 2016/0190678 A1 | 6/2016 | Hong et al. |
| 2017/0187422 A1* | 6/2017 | Hosseini ................ H02J 50/27 |
| 2017/0285844 A1* | 10/2017 | Park ..................... G06F 1/1647 |
| 2019/0237875 A1 | 8/2019 | Yamagishi et al. |
| 2020/0126837 A1* | 4/2020 | Kuno ...................... B23Q 3/15 |
| 2020/0144170 A1* | 5/2020 | Yazdani ............ H01L 23/49827 |
| 2020/0219794 A1* | 7/2020 | Komatsu ........... H01L 23/49822 |
| 2020/0411959 A1 | 12/2020 | Ryu et al. |
| 2021/0034184 A1* | 2/2021 | Lin ..................... G06F 3/0412 |
| 2021/0126348 A1 | 4/2021 | Kim et al. |
| 2021/0358996 A1 | 11/2021 | Lee et al. |

FOREIGN PATENT DOCUMENTS

| | | |
|---|---|---|
| JP | 2017175540 A | 9/2017 |
| JP | 2018207216 A | 12/2018 |
| KR | 20160036436 A | 4/2016 |
| KR | 20160080444 A | 7/2016 |
| KR | 20170124449 A | 11/2017 |
| KR | 101967771 B1 | 4/2019 |
| KR | 101962821 B1 | 7/2019 |
| KR | 20190090226 A | 8/2019 |
| KR | 20190105812 A | 9/2019 |
| KR | 20190108464 A | 9/2019 |
| KR | 20200038797 A | 4/2020 |
| KR | 20200043124 A | 4/2020 |
| KR | 20200098740 A | 8/2020 |
| KR | 102162228 B1 | 10/2020 |
| KR | 20210141802 A | 11/2021 |

* cited by examiner

ELECTRONIC DEVICE COMPRISING AN ANTENNA

CROSS-REFERENCE TO RELATED APPLICATION(S)

This application is a continuation application, claiming priority under § 365(c), of International Application No. PCT/KR2021/013025 filed on Sep. 24, 2021, which is based on and claims the benefit of Korean patent application number 10-2020-0129608, filed on Oct. 7, 2020, in the Korean Intellectual Property Office, the disclosures of which are incorporated by reference herein in their entireties.

TECHNICAL FIELD

Various embodiments of the disclosure relate to an electronic device including a dummy pattern to reduce a visibility of a display antenna.

BACKGROUND ART

A portable electronic device such as a portable communication device, a mobile terminal, a mobile communication terminal, or a smartphone may communicate with an external electronic device by using a communication circuit and an antenna, or may be connected to an external device disposed in a nearby area by using a predetermined network.

In order to satisfy the increasing demand for wireless data traffic after the commercialization of 4G ($4^{th}$-generation) communication systems, efforts have been made to develop a 5G ($5^{th}$-generation) communication system or a pre-5G communication system.

In order to achieve a high data transmission rate, implementation of the 5G communication system in a radio-frequency or RF (e.g., mmWave) band (e.g., 20 GHz to about 300 GHz) is being considered. In order to prevent radiation performance deterioration due to metal materials in electronic devices or to ensure radiation directions, in the 5G communication system, beamforming, massive multiple-input and multiple-output (MIMO), intenna on display (IoD), array antenna, antenna on display (AoD), and/or large scale antenna technologies are being discussed.

DISCLOSURE OF INVENTION

Technical Problem

An electronic device may include a metal member (e.g., a metal bezel or a shield layer included in a display). In this case, the display antenna may be designed to prevent radiation performance deterioration due to a metal member and to ensure radiation directions. In an embodiment, the display antenna may be implemented by using a conductive mesh pattern made by using a plurality of conductive lines.

However, the display antenna may be disposed in front of the display panel on which a screen is output for forward radiation, and may be disposed to overlap the display panel to ensure antenna performance. Accordingly, since the antenna covers some image signals that are output from the display panel, a decrease in brightness, a moiré phenomenon, a mottle, or a pattern visibility phenomenon may occur in an area where the antenna is implemented.

According to various embodiments of the disclosure, it is possible to provide an electronic device in which a dummy pattern is provided to reduce a phenomenon in which mesh patterns in an antenna area are visually recognized.

Solution to Problem

An electronic device according to various embodiments of the disclosure may include a display including a plurality of layers, a conductive mesh pattern disposed on a first layer among the plurality of layers and adjacent to a first edge of the display, a power feed line connected to the conductive mesh pattern at the first edge, and a wireless communication circuit electrically connected to the power feed line and configured to feed power to the conductive mesh pattern via the power feed line. In a first area between the conductive mesh pattern and the first edge among areas surrounding the conductive mesh pattern, the first layer may include a dummy pattern spaced apart from the conductive mesh pattern and the power feed line. In a second area excluding the first area among the areas surrounding the conductive mesh pattern, the first layer may not include a conductive pattern.

An electronic device according to various embodiments of the disclosure may include a display including a plurality of layers, a conductive mesh pattern disposed on a first layer among the plurality of layers and provided inside a first edge of the display, a power feed line connected to the conductive mesh pattern at the first edge, and a wireless communication circuit electrically connected to the power feed line and configured to feed power to the conductive mesh pattern via the power feed line. The first layer may include a dummy pattern surrounding the conductive mesh pattern and the power feed line and spaced apart from the conductive mesh pattern and the power feed line. The dummy pattern may have a first aperture ratio in a first area adjacent to the conductive mesh pattern, and a second aperture ratio, which is higher than the first aperture ratio, in a second area spaced farther away from the conductive mesh pattern than the first area.

An electronic device according to various embodiments of the disclosure may include a display including a plurality of layers, one or more conductive mesh patterns disposed on a first layer among the plurality of layers and inside a first edge of the display, at least one power feed line connected to the one or more conductive mesh patterns at the first edge, a wireless communication circuit electrically connected to the power feed line and configured to feed power to the conductive mesh patterns via the power feed line, and one or more dummy patterns surrounding the one or more conductive mesh patterns and the at least one power feed line and spaced apart from the conductive mesh patterns and the power feed line. At least a portion of the outline of the dummy pattern may have an irregular pattern.

Advantageous Effects of Invention

Various embodiments of the disclosure may reduce a phenomenon in which mesh patterns are visually recognized in an area where an antenna included in a display of an electronic device is disposed.

BEST MODE FOR CARRYING OUT THE INVENTION

Figure 1:
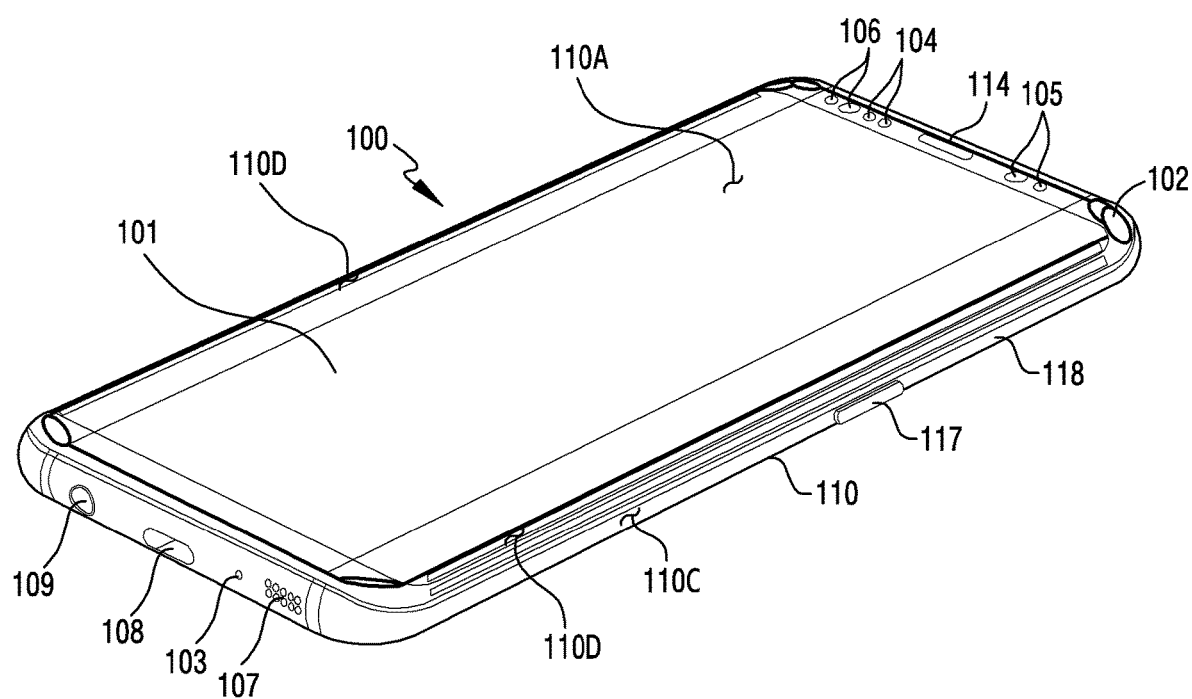
FIG. 1 is a front perspective view of a mobile electronic device according to an embodiment.
Figure 2:
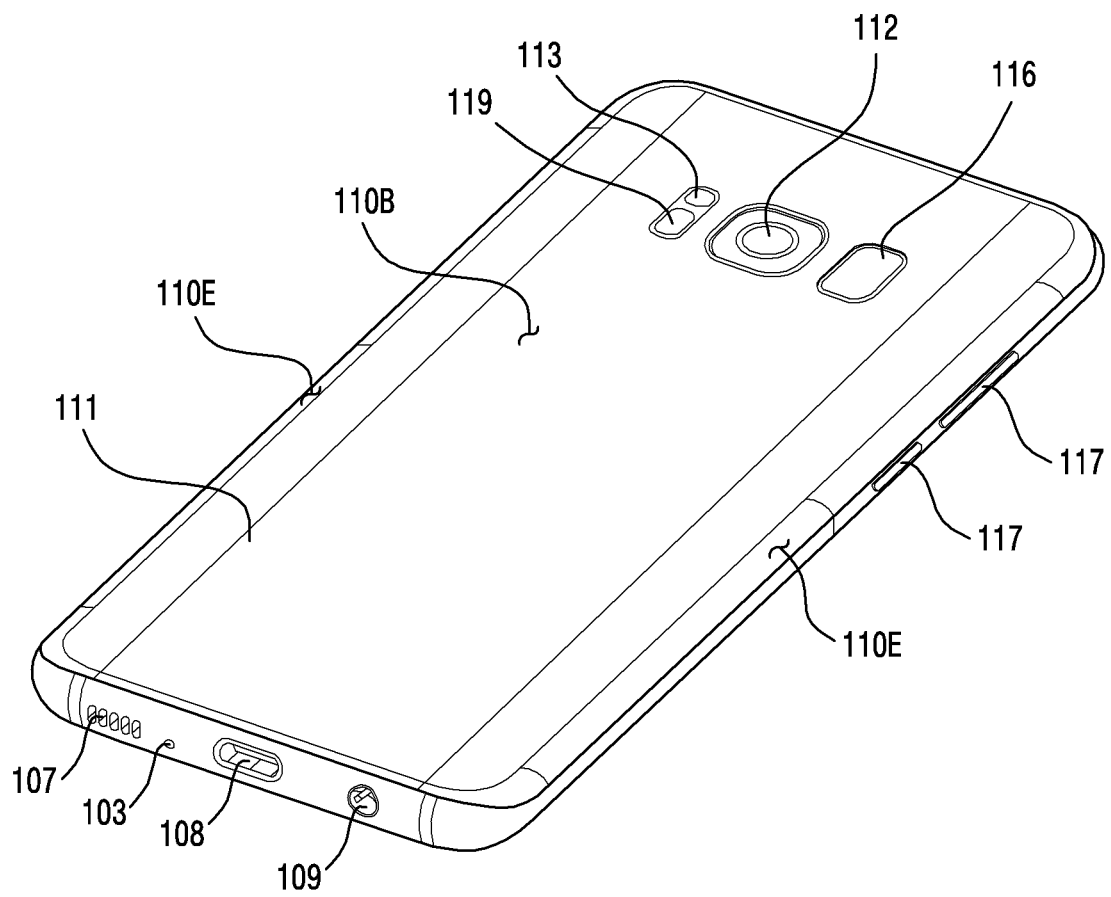
FIG. 2 is a rear perspective view of the electronic device of FIG. 1.
Figure 3:
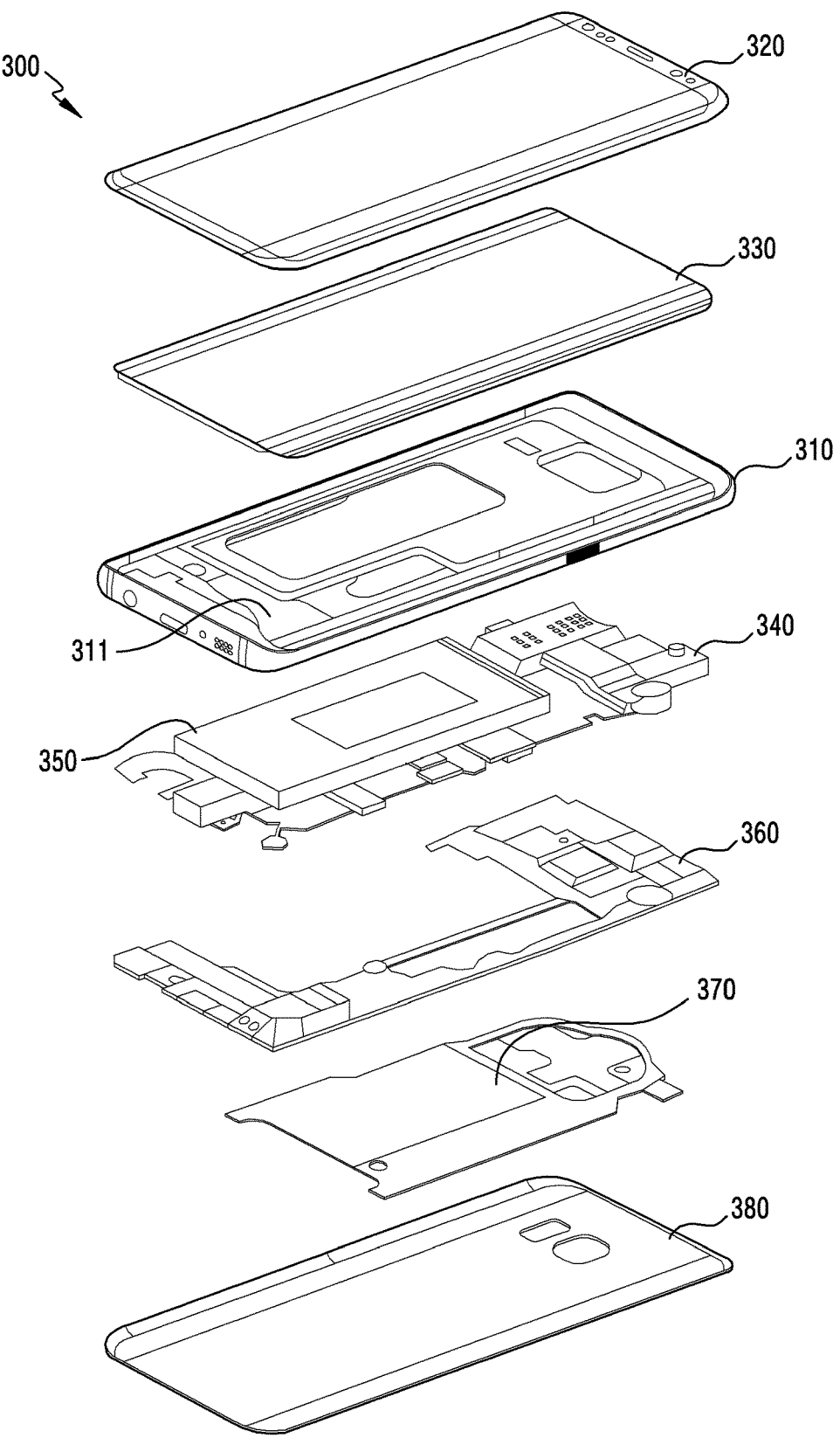
FIG. 3 is an exploded perspective view of the electronic device of FIG. 1.

FIG. 1 is a front perspective view of a mobile electronic device according to an embodiment. FIG. 2 is a rear perspective view of the electronic device of FIG. 1. FIG. 3 is an exploded perspective view of the electronic device of FIG. 1.

Referring to FIGS. 1 and 2, an electronic device 100 according to an embodiment may include a housing 110 including a first surface (or a front surface) 110A, a second surface (or a rear surface) 110B, and a side surface 110C surrounding the space between the first surface 110A and the second surface 110B. In another embodiment (not illustrated), the term "housing" may refer to a structure defining some of the first surface 110A, the second surface 110B, and the side surface 110C of FIG. 1. According to an embodiment, at least a portion of the first surface 110A may be configured with a substantially transparent front surface plate 102 (e.g., a glass plate or a polymer plate including various coating layers). The second surface 110B may be configured with a substantially opaque rear surface plate 111. The rear surface plate 111 may be made of, for example, coated or colored glass, ceramic, polymer, metal (e.g., aluminum, stainless steel (STS), or magnesium), or a combination of two or more of these materials. The side surface 110C may be configured with a side surface bezel structure (or a "side surface member") 118 coupled to the front surface plate 102 and the rear surface plate 111 and including metal and/or polymer. In some embodiments, the rear surface plate 111 and the side surface bezel structure 118 may be integrally configured and may include the same material (e.g., a metal material such as aluminum).

In the illustrated embodiment, the front surface plate 102 may include, at the long opposite side edges thereof, two first areas 110D, which are bent from the first surface 110A toward the rear surface plate 111 and extend seamlessly. In the illustrated embodiment (see FIG. 2), the rear surface plate 111 may include, at the long opposite side edges thereof, two second areas 110E, which are bent from the second surface 110B toward the front surface plate 102 and extend seamlessly. In some embodiments, the front surface plate 102 (or the rear surface plate 111) may include only one of the first areas 110D (or the second areas 110E). In another embodiment, some of the first areas 110D or the second areas 110E may not be included. In the above-described embodiments, in the side surface of the electronic device 100, the side surface bezel structure 118 may have a first thickness (or width) on the side where the first areas 110D or the second areas 110E are not included, and may have a second thickness, which is thinner than the first thickness, on the side where the first areas 110D or the second areas 110E are included.

According to an embodiment, the electronic device 100 may include at least one of a display 101, audio modules 103, 107, and 114, sensor modules 104, 116, and 119, camera modules 105, 112, and 113, key input devices 117, light-emitting elements 106, and connector holes 108 and 109. In some embodiments, in the electronic device 100, at least one of the components (e.g., the key input devices 117 or the light-emitting elements 106) may be omitted, or other components may be additionally included.

The display 101 may be exposed through a substantial portion of, for example, the front surface plate 102. In some embodiments, at least a portion of the display 101 may be exposed through the front surface plate 102 providing the first surface 110A and the first areas 110D of the side surface 110C. In some embodiments, the edges of the display 101 may be configured to be substantially the same as the shape of the periphery of the front surface plate 102 adjacent thereto. In another embodiment (not illustrated), the distance between the outer periphery of the display 101 and the outer periphery of the front plate 102 may be substantially constant in order to enlarge the exposed area of the display 101.

In another embodiment (not illustrated), recesses or openings may be provided in a portion of a screen display area of the display 101, and at least one of an audio module 114, a sensor module 104, a camera module 105, and a light-emitting element 106, which are aligned with the recesses or the openings, may be included. In another embodiment (not illustrated), the rear surface of the screen display area of the display 101 may include at least one of audio modules 114, sensor modules 104, camera modules 105, a fingerprint sensor 116, and light-emitting elements 106 (only a fingerprint sensor 116 is shown for clarity and brevity). In another embodiment (not illustrated), the display 101 may be coupled to or disposed adjacent to a touch-sensitive circuit, a pressure sensor capable of measuring a touch intensity (pressure), and/or a digitizer configured to detect an electromagnetic field-type stylus pen. In some embodiments, at least some of the sensor modules 104 and 119 and/or at least some of the key input devices 117 may be disposed in the first areas 110D and/or the second areas 110E.

The audio modules 103, 107, and 114 may include a microphone hole 103 and speaker holes 107 and 114. The microphone hole 103 may include a microphone disposed therein to acquire external sound, and in some embodiments, a plurality of microphones may be disposed therein to be able to detect the direction of sound. The speaker holes 107 and 114 may include an external speaker hole 107 and a communication receiver hole 114. In some embodiments, while implementing the speaker holes 107 and 114 and the microphone hole 103 as a single hole, or without the speaker holes 107 and 114, a speaker (e.g., a piezo speaker) may be included.

The sensor modules 104, 116, and 119 may generate electrical signals or data values corresponding to an internal operating state of the electronic device 100 or an external environmental state. The sensor modules 104, 116, and 119 may include, for example, a first sensor module 104 (e.g., a proximity sensor) and/or a second sensor module (not illustrated) (e.g., a fingerprint sensor) disposed on the first surface 110A of the housing 110, and/or a third sensor module 119 (e.g., an HRM sensor) and/or a fourth sensor module 116 (e.g., a fingerprint sensor) disposed on the second surface 110B of the housing 110. The fingerprint sensor may be disposed not only on the first surface 110A of the housing 110 (e.g., the display 101), but also on the second surface 110B. The electronic device 100 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 and/or a flash 113 disposed on the second surface 110B of the electronic device 100. The camera devices 105 and 112 may include one or more lenses, an image sensor, and/or an image signal processor. The flash 113 may include, for example, a light-emitting diode or a xenon lamp. In some embodiments, two or more lenses (e.g., an infrared camera lens, a wide-angle lens, and a telephoto lens) and image sensors may be disposed on one surface of the electronic device 100.

The key input devices 117 may be disposed on the side surface 110C of the housing 110. In another embodiment, the electronic device 100 may not include some or all of the above-mentioned key input devices 117, and a key input device 117, which is not included, may be implemented in another form, such as a soft key, on the display 101. In some embodiments, the key input devices may include a sensor module 116 disposed on the second surface 110B of the housing 110.

The light-emitting element 106 may be disposed, for example, on the first surface 110A of the housing 110. The light-emitting elements 106 may provide, for example, the state information of the electronic device 100 in an optical form. In another embodiment, the light-emitting elements 106 may provide a light source that is interlocked with, for example, the operation of the camera module 105. The light-emitting elements 106 may include, for example, an LED, an IR LED, and a xenon lamp.

The connector holes 108 and 109 may include a first connector hole 108, which is capable of accommodating a connector (e.g., a USB connector) configured to transmit/receive power and/or data to/from an external electronic device, and/or a second connector hole (e.g., an earphone jack) 109, which is capable of accommodating a connector for transmitting/receiving an audio signal to/from an external electronic device.

Referring to FIG. 3, an electronic device 300 may include a side surface bezel structure 310, a first support member 311 (e.g., a bracket), a front plate 320, a display 330, a printed circuit board 340, a battery 350, a second support member 360 (e.g., a rear case), an antenna 370, and a rear surface plate 380. In some embodiments, at least one of the components (e.g., the first support member 311 or the second support member 360) may be omitted from the electronic device 300, or other components may be additionally included in the electronic device 101. At least one of the components of the electronic device 300 may be the same as or similar to at least one of the components of the electronic device 300 of FIG. 1 or 2, and a redundant description thereof will be omitted below.

The first support member 311 may be disposed inside the electronic device 300 to be connected to the side surface bezel structure 310, or may be configured integrally with the side surface bezel structure 310. The first support member 311 may be made of, for example, a metal material and/or a non-metal (e.g., polymer) material. The first support member 311 may have one surface to which the display 330 is coupled, and the other surface to which the printed circuit board 340 is coupled. A processor, memory, and/or interface may be mounted on the printed circuit board 340. The processor may include one or more of, for example, a central processing unit, an application processor, a graphics processor, an image signal processor, a sensor hub processor, or a communication processor.

The memory may include, for example, volatile memory or nonvolatile memory.

The interface may include, for example, a high-definition multimedia interface (HDMI), a universal serial bus (USB) interface, an SD card interface, and/or an audio interface. The interface may electrically or physically connect, for example, the electronic device 300 to an external electronic device and may include a USB connector, an SD card/an MMC connector, or an audio connector.

The battery 350 is a device for supplying power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

The antenna 370 may be disposed between the rear surface plate 380 and the battery 350. The antenna 370 may include, for example, a near-field communication (NFC) antenna, a wireless charging antenna, and/or a magnetic secure transmission (MST) antenna. For example, the antenna 370 may execute short-range communication with an external device or may transmit/receive power required for charging to/from the external device in a wireless manner. In another embodiment, an antenna structure may be configured by a portion of the side surface bezel structure 310 and/or a portion of the first support member 311, or a combination thereof.

Figure 4:
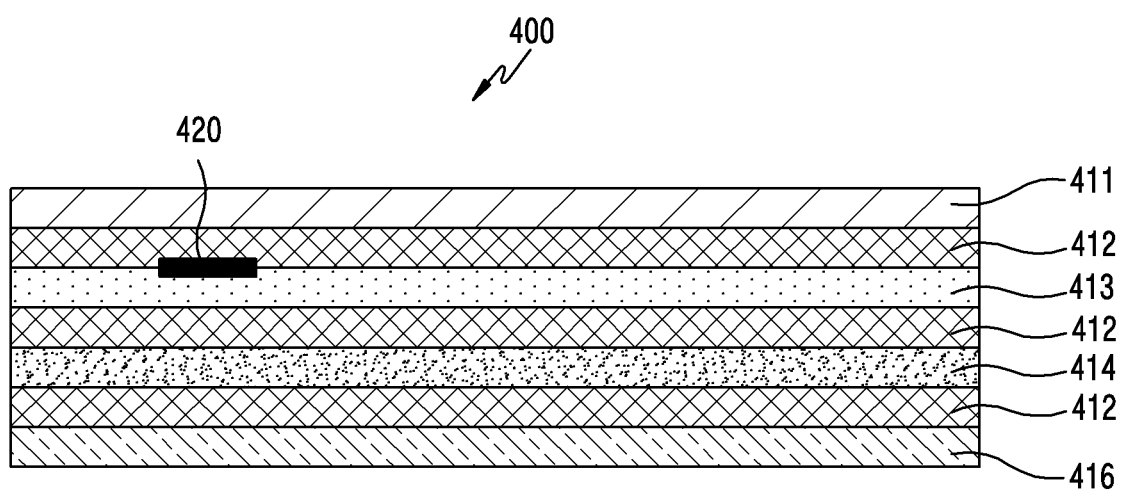
FIG. 4 is a cross-sectional view of a display according to an embodiment.

FIG. 4 is a cross-sectional view of a display according to an embodiment.

Referring to FIG. 4, a display 400 according to an embodiment may include a plurality of layers. According to an embodiment, the display 400 may include a first layer 413 on which an antenna pattern 420 is disposed, one or more second layers 412, a transparent plate 411, a display panel 414, and an adhesive layer 416. According to another embodiment, some of the above-mentioned components (e.g., the adhesive layer 416) may be omitted. In an embodiment, the antenna pattern 420 may include a patch shape.

For example, the antenna pattern 420 may be configured in a patch shape by using a mesh including a plurality of conductive lines or in a patch shape by using a conductive plate. According to an embodiment, the first layer 413 may include a touch panel on which electrodes configured to receive a touch input, to recognize a fingerprint, or to receive a pen input are disposed. According to an embodiment, the antenna pattern 420 may be disposed between the first layer 413 and the second layer 412. For example, the antenna pattern 420 may be disposed between the top surface of the first layer 413 and the bottom surface of the second layer 412.

According to an embodiment, the display 400 may include one or more second layers 412. According to an embodiment, the second layer 412 may include an adhesive layer. For example, the adhesive layer may include an optically clear adhesive (OCA), a pressure-sensitive adhesive (PSA), a heat-reactive adhesive, a general adhesive, or a double-sided tape. According to another embodiment, the second layer 412 may include a polarizer, but is not limited thereto.

According to an embodiment, the display 400 may include a transparent plate 411 exposed outside the electronic device. For example, the transparent plate 411 may include at least one of glass or polyimide (PI), but is not limited thereto.

According to an embodiment, the display 400 may include a display panel 414. The display panel 414 according to an embodiment may include an organic light-emitting diode (OLED) panel, a liquid crystal display (LCD), or a quantum dot light-emitting diode (QLED) panel. The display panel 414 may include a plurality of pixels for displaying an image, and one pixel may include a plurality of sub-pixels. As an example, one pixel may include three colors of a red sub-pixel, a green sub-pixel, and a blue sub-pixel. As another example, one pixel may include four colors of a red sub-pixel, a green sub-pixel, a blue sub-pixel, and a white sub-pixel.

According to an embodiment, the display 400 may include an adhesive layer 416. According to an embodiment, the display 400 may be bonded to an internal support structure or housing via an adhesive layer 416. For example, the adhesive layer 416 may include at least one of a thermally reactive adhesive or a double-sided adhesive, but is not limited thereto.

Figure 5:
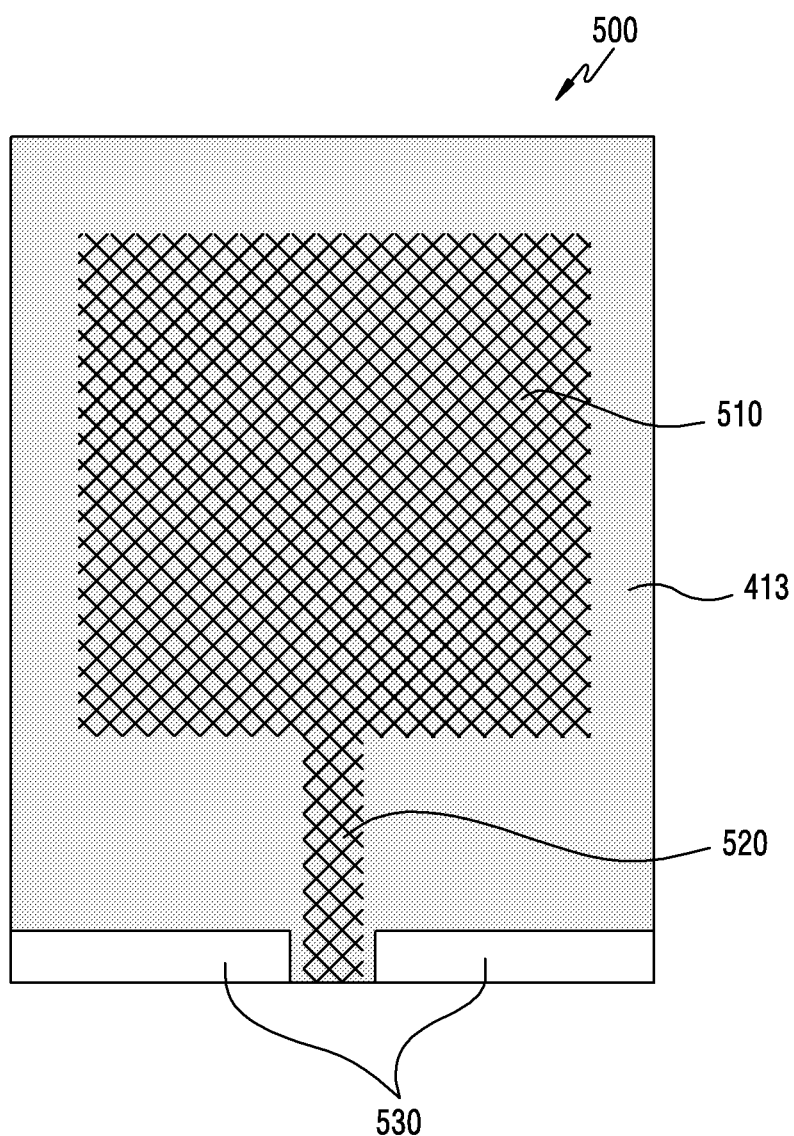
FIG. 5 illustrates an antenna structure including an antenna pattern according to an embodiment.

FIG. 5 illustrates an antenna structure including an antenna pattern according to an embodiment.

Referring to FIG. 5, an antenna structure 500 according to an embodiment may be disposed on the first layer 413. The antenna structure 500 according to an embodiment may be included in the first layer 413. The antenna structure 500 according to an embodiment may include an antenna pattern 510, a power feed line 520, and a ground portion 530. In an embodiment, the description of the antenna pattern 420 of FIG. 4 may also be applied to the antenna pattern 510 of FIG. 5.

According to an embodiment, the antenna pattern 510 may be disposed on the first layer 413. According to an embodiment, the antenna pattern 510 may be disposed adjacent to an edge of the first layer 413. According to an embodiment, the antenna pattern 510 may include a mesh pattern. For example, the antenna pattern 510 may include a metal mesh pattern having a rhombic shape. Without being limited thereto, the antenna pattern 510 may include various types of patterns such as a square or hexagonal mesh structure. According to an embodiment, the metal mesh structure of the antenna pattern 510 may include a metal material having high conductivity (e.g., silver (Ag), a silver-alloy (Ag-alloy), aluminum (Al), an aluminum-alloy (Al-alloy), copper (Cu), or a copper-alloy (Cu-alloy)). The antenna pattern 510 according to an embodiment may include indium tin oxide (ITO), but is not limited thereto. Hereinafter, the antenna pattern 510 will be described as having a mesh pattern having a rhombic structure.

According to an embodiment, the power feed line 520 may include a mesh pattern. The power feed line 520 according to an embodiment may extend from one end of the first layer 413 and may be electrically connected to the antenna pattern 510. According to an embodiment, the power feed line 520 may include a coplanar waveguide (CPW). According to another embodiment, the power feed line 520 may be provided as or may include a microstrip, but is not limited thereto.

According to an embodiment, the antenna pattern 510 may be electrically connected to a wireless communication circuit (e.g., the wireless communication module 1492 of FIG. 14) via the power feed line 520. According to an embodiment, the wireless communication circuit (e.g., the wireless communication module 1492 of FIG. 14) may feed power to the antenna pattern 510 via the power feed line 520. For example, the wireless communication circuit feeds power to the antenna pattern 510 via the power feed line 520 so that the antenna pattern 510 can transmit or receive a signal of a first frequency band (e.g., about 28 GHz, about 39 GHz, or about 60 GHz). For example, the wireless communication circuit may enable the antenna pattern 510 to transmit or receive a signal in the mmWave frequency band by feeding power to the antenna pattern 510 via the power feed line 520. According to an embodiment, the ground portion 530 may operate as an antenna ground.

Figure 6:
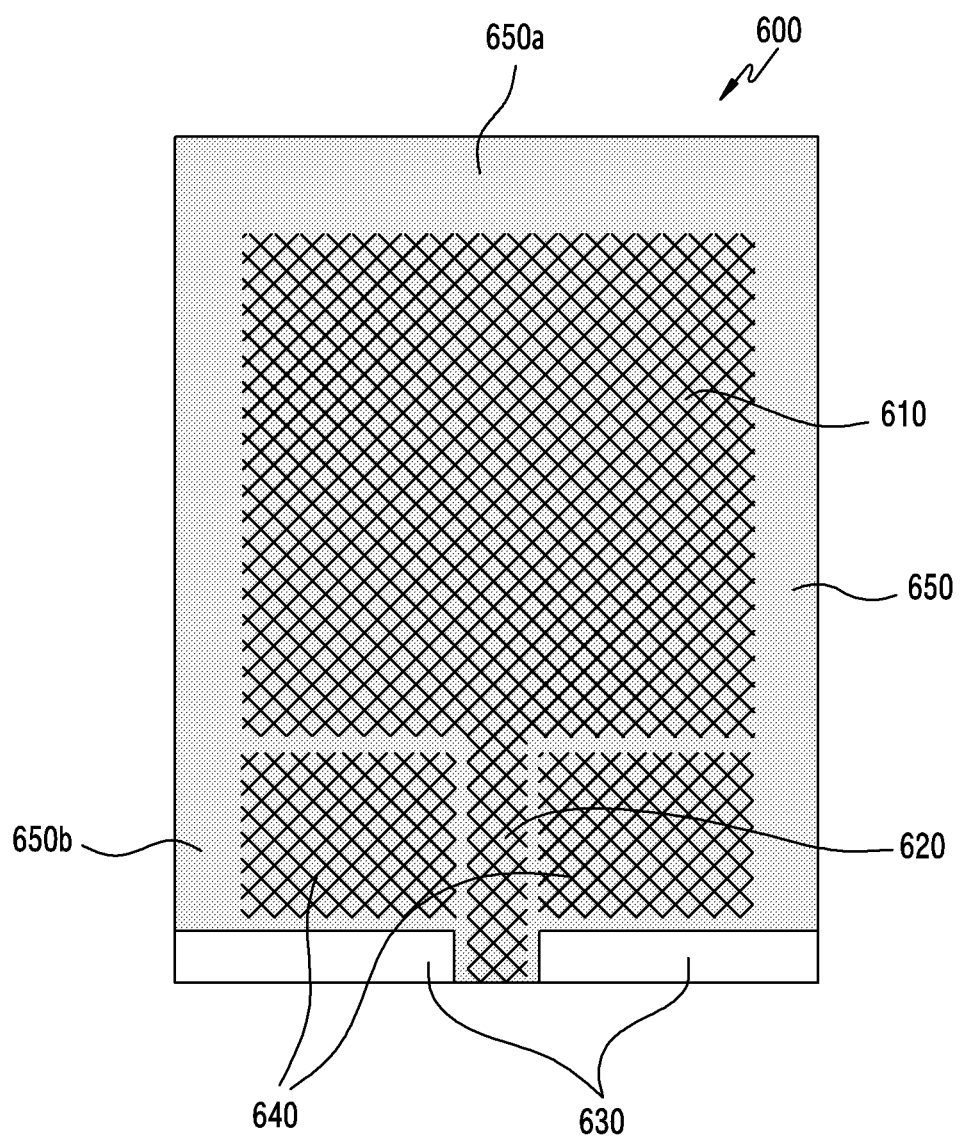
FIG. 6 illustrates an antenna structure including a dummy pattern according to an embodiment.

FIG. 6 illustrates an antenna structure including a dummy pattern according to an embodiment.

Referring to FIG. 6, an antenna structure 600 according to an embodiment may include an antenna pattern 610, a power feed line 620, a ground portion 630, and at least one dummy pattern 640. The same reference numerals are used for substantially the same components, and redundant descriptions will be omitted.

According to an embodiment, the first layer 650 may include a first area 650a between the antenna pattern 610 and the ground portion 630 and a second area 650b excluding the first area 650a among areas surrounding the antenna pattern 610. The first layer 650 may be understood as the first layer 413 of FIG. 4, but is not limited thereto. According to an embodiment, the dummy pattern 640 may be disposed on the first layer 650. The dummy pattern 640 according to an embodiment may be disposed in a first area 650a between the antenna pattern 610 and the ground portion 630.

According to an embodiment, the dummy pattern 640 may be spaced apart from the antenna pattern 610 in the first area 650a. According to an embodiment, the dummy pattern 640 may be spaced apart from the antenna pattern 610, the power feed line 620, and the ground portion 630. For example, the dummy pattern 640 may be electrically floated from a wireless communication circuit (e.g., the wireless communication module 1492 of FIG. 14).

According to an embodiment, the dummy pattern 640 may include a conductive pattern. According to an embodiment, the dummy pattern 640 may include a pattern identical to or similar to the antenna pattern 610. For example, the dummy pattern 640 may include a metal mesh pattern having a rhombic structure. As another example, the dummy pattern 640 may include a metal patch, but is not limited thereto.

Figure 7:
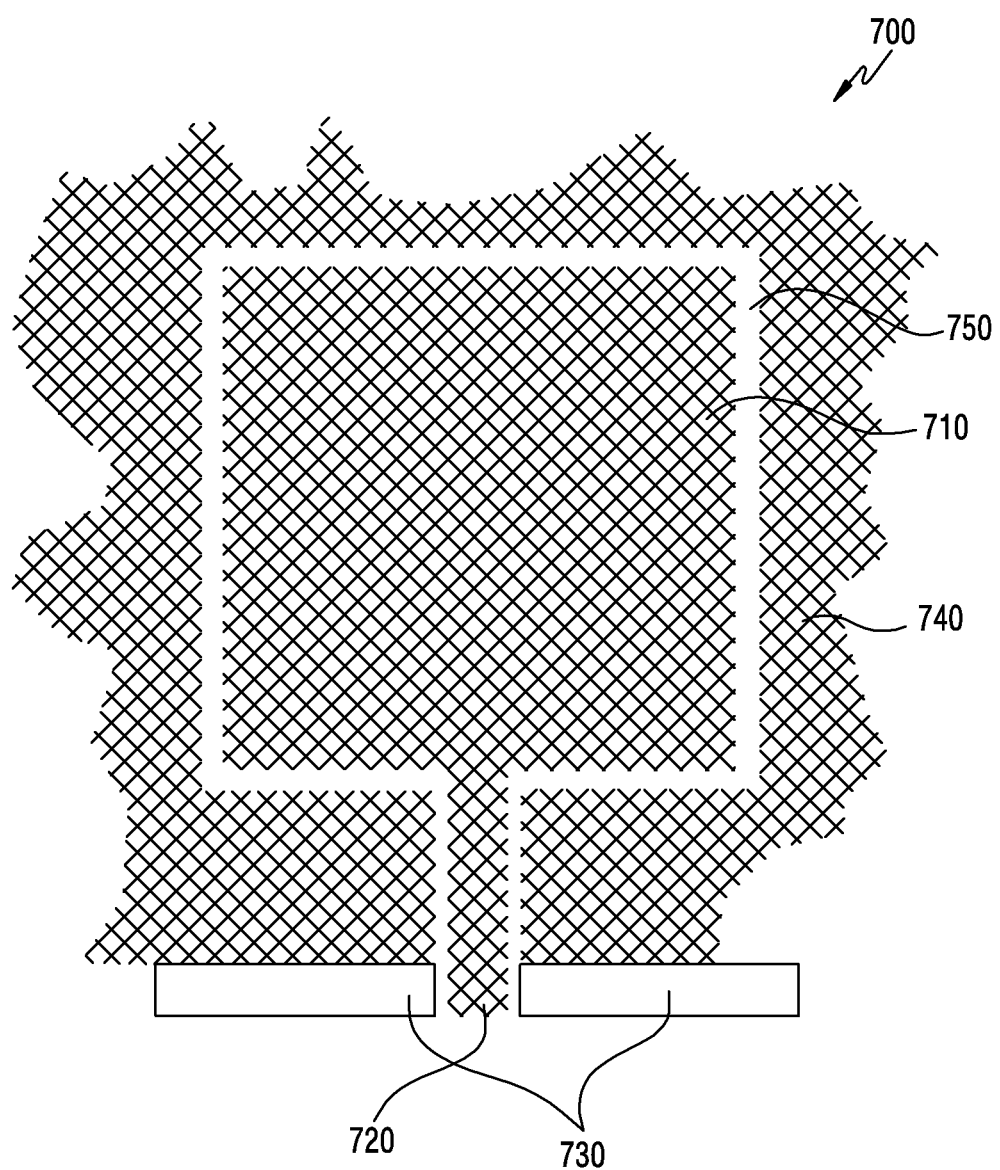
FIG. 7 illustrates an antenna structure including a dummy pattern including an irregular outline according to an embodiment.

FIG. 7 illustrates an antenna structure including a dummy pattern including an irregular outline according to an embodiment.

Referring to FIG. 7, an antenna structure 700 according to an embodiment may include an antenna pattern 710 (e.g., the antenna pattern 610 of FIG. 6), a power feed line 720 (e.g., the power feed line 620 of FIG. 6), a ground portion 730 (e.g., the ground portion 630 of FIG. 6), and a dummy pattern 740. The same reference numerals are used for substantially the same components, and redundant descriptions will be omitted.

Referring to FIGS. 4 and 7 together, the dummy pattern 740 according to an embodiment may be disposed on the first layer 413. According to an embodiment, the dummy pattern 740 may be disposed in an area surrounding the antenna pattern 710 of the first layer 413. According to an embodiment, the dummy pattern 740 may be spaced apart from the antenna pattern 710 in the area surrounding the antenna pattern 710. According to an embodiment, a gap 750 may be disposed between the dummy pattern 740 and the antenna pattern 710. According to an embodiment, the dummy pattern 740 may be spaced apart from the antenna pattern 710, the power feed line 720, and the ground portion 730. The dummy pattern 740 according to an embodiment may be electrically floated with the antenna pattern 710, the power feed line 720, and the ground portion 730. According to another embodiment, the dummy pattern 740 may be electrically connected to the ground portion 730.

According to an embodiment, at least a portion of the outline of the dummy pattern 740 may have an irregular shape. According to an embodiment, at least a portion of the outline of the dummy pattern 740 that is not adjacent to the antenna pattern 710 may have an irregular shape. According to an embodiment, since the dummy pattern 740 includes an irregular shape, irregular diffraction of light may occur. According to an embodiment, visibility of the antenna pattern 710 and the dummy pattern 740 may be reduced through the irregular diffraction of light.

According to an embodiment, the dummy pattern 740 may include a conductive pattern. According to an embodiment, the dummy pattern 740 may include a pattern that is the same as or similar to the antenna pattern 710. For example, the dummy pattern 740 may include a rhombic metal mesh pattern, but is not limited thereto.

Figure 8:
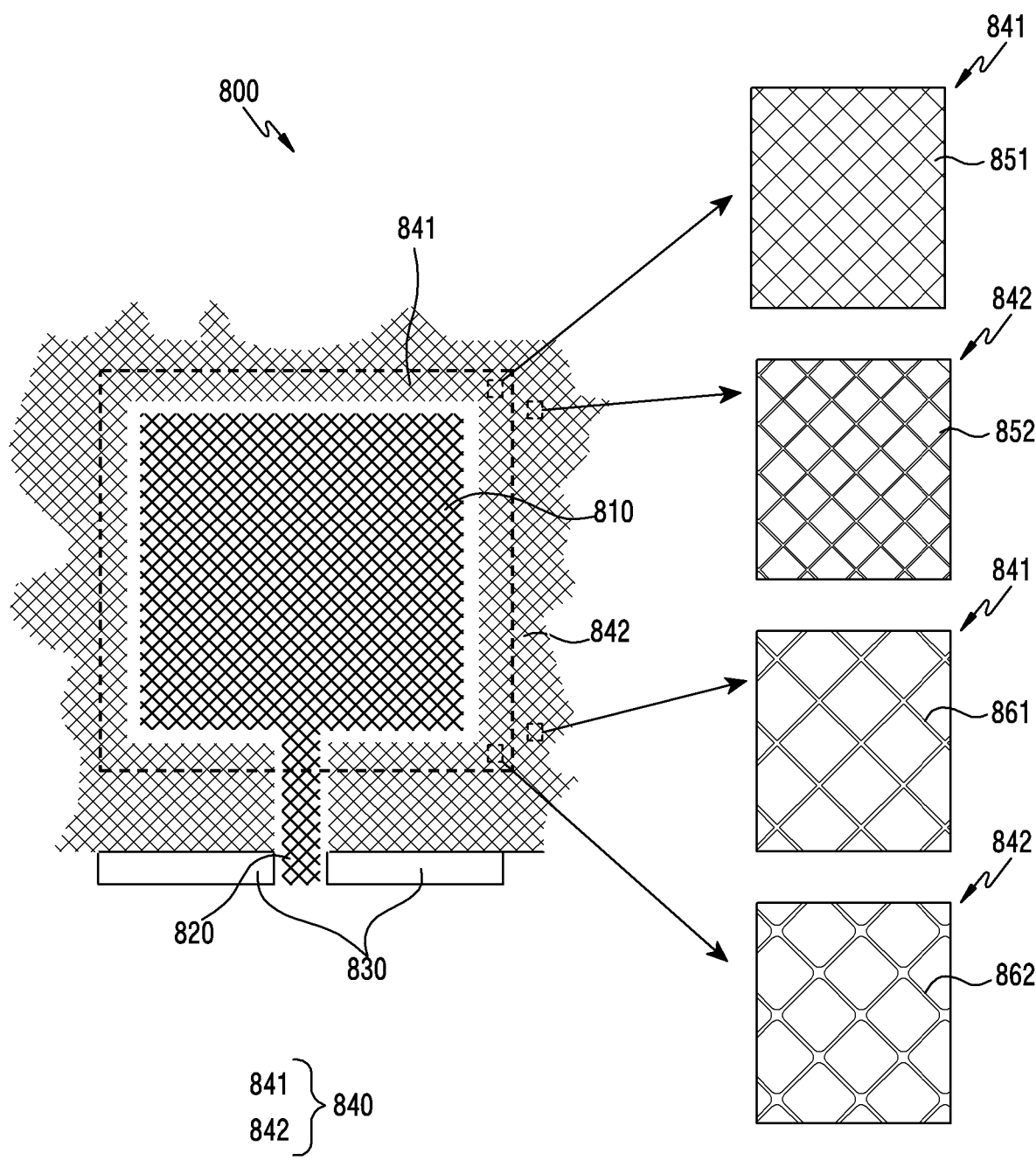
FIG. 8 illustrates an antenna structure including a dummy pattern having a variable aperture ratio according to an embodiment.

FIG. 8 illustrates an antenna structure including a dummy pattern having a variable aperture ratio according to an embodiment.

Referring to FIG. 8, an antenna structure 800 according to an embodiment may include an antenna pattern 810 (e.g., the antenna pattern 610 of FIG. 6), a power feed line 820 (e.g., the power feed line 620 of FIG. 6), a ground portion 830 (e.g., the ground portion 630 of FIG. 6), and a dummy pattern 840. The same reference numerals are used for substantially the same components, and redundant descriptions will be omitted.

According to an embodiment, the dummy pattern 840 may be disposed to surround the antenna pattern 810. According to an embodiment, the dummy pattern 840 may surround the antenna pattern and may be spaced apart from the antenna pattern 810. The dummy pattern 840 may include a mesh pattern. The mesh pattern may have a first aperture ratio or a second aperture ratio.

According to an embodiment, the dummy pattern 840 may include a first area 841 surrounding the antenna pattern 810 and adjacent to the antenna pattern 810 and a second area 842, which is not adjacent to the antenna pattern 810 owing to the first area 841 being between the antenna pattern 810 and the second area 842. According to an embodiment, the first area 841 of the dummy pattern 840 may have a first aperture ratio. According to an embodiment, the second area 842 of the dummy pattern 840 may have a second aperture ratio. According to an embodiment, the second area 842 of the dummy pattern 840 may have a second aperture ratio higher than the first aperture ratio.

According to an embodiment, the dummy pattern 840 may include a first mesh pattern 851 in the first area 841. The dummy pattern 840 according to an embodiment may include a second mesh pattern 852 in the second area. According to an embodiment, the second mesh pattern 852 may include a mesh having a greater area than the first mesh pattern 851. According to an embodiment, the mesh size of the first mesh pattern 851 may increase as the first area 841 is closer to the second area 842. For example, the mesh size of the first mesh pattern 851 may gradually increase with decreasing distance to the second area 842. According to an embodiment, within the second area 842, the mesh size of the second mesh pattern 852 may increase with increasing distance from the antenna pattern 810. For example, the mesh size of the second mesh pattern 852 may gradually increase with increasing distance from the antenna pattern 810. According to an embodiment, as the mesh size of the dummy pattern 840 increases, the visibility of the dummy pattern 840 may decrease.

According to another embodiment, the mesh pattern of the dummy pattern 840 may include a first line 861 and a second line 862. According to an embodiment, the first area 841 may include the first line 861. The second area 842 according to an embodiment may include a second line 862. According to an embodiment, the first line 861 may include a greater line width than the second line 862. According to an embodiment, within the first area 841, the line width of the first line 861 may decrease with decreasing distance to the second area 842. For example, the line width of the first line 861 may gradually decrease with decreasing distance to the second area 842. According to an embodiment, in the second area 842, the line width of the second line 862 may decrease with increasing distance from the antenna pattern 810. For example, the line width of the second line 862 may gradually decrease with increasing distance from the antenna pattern 810. According to an embodiment, as the line width decreases, the visibility of the antenna pattern 810 and/or the dummy pattern 840 may decrease.

Figure 9A:
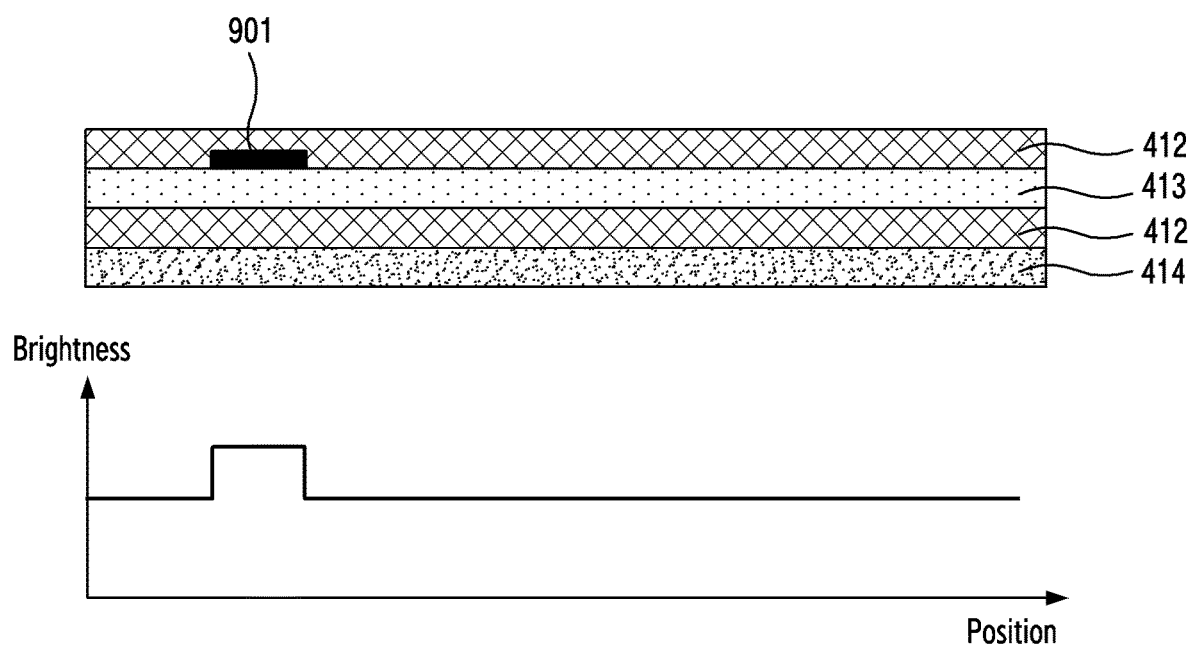
FIG. 9A illustrates brightness of an area corresponding to an antenna pattern in a display panel according to an embodiment.
Figure 9B:
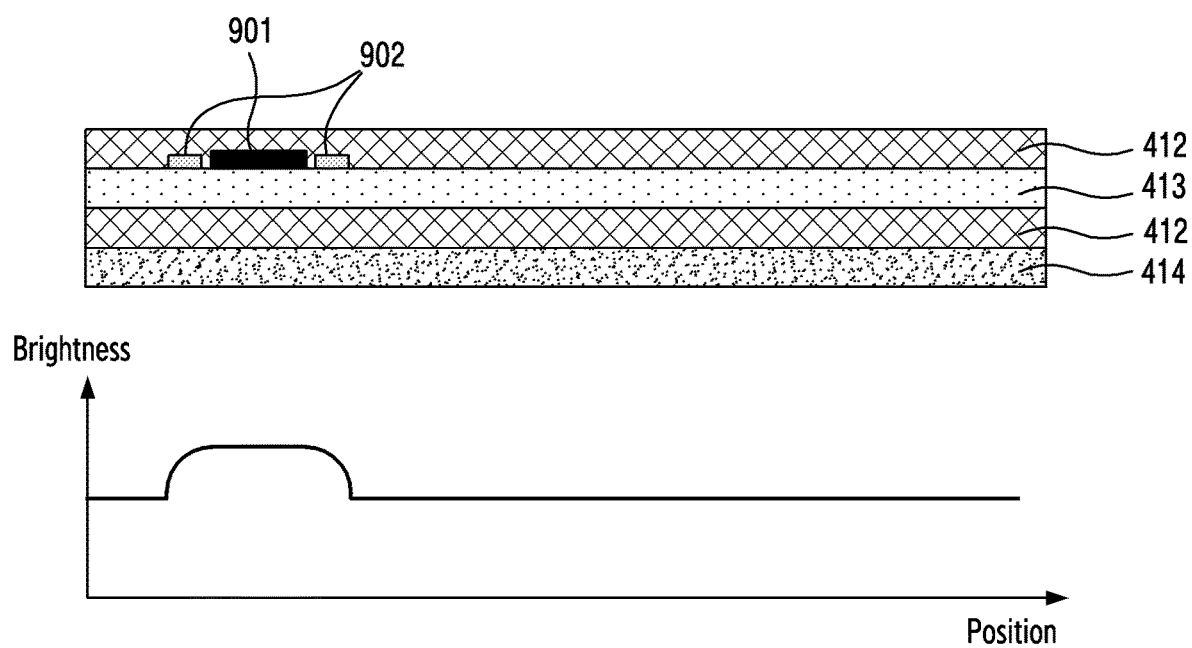
FIG. 9B illustrates brightness compensation of areas corresponding to an antenna pattern and a dummy pattern in a display panel according to an embodiment.

FIG. 9A illustrates brightness of an area corresponding to an antenna pattern in a display panel according to an embodiment. FIG. 9B illustrates brightness compensation of areas corresponding to an antenna pattern and a dummy pattern in a display panel according to an embodiment.

Referring to FIGS. 9A and 9B together, a display according to an embodiment may include a second layer 412, a first layer 413, and a display panel 414. According to an embodiment, the first layer 413 may include an antenna pattern 901. According to another embodiment, the antenna pattern 901 may be disposed on the first layer 413, but is not limited thereto. According to an embodiment, the first layer 413 may include an antenna pattern 901 and a dummy pattern 902. According to an embodiment, the dummy pattern 902 may be disposed adjacent to the antenna pattern 901.

According to an embodiment, the electronic device may include at least one processor electrically connected to the display panel 414. According to an embodiment, at least one processor may control the display panel 414 to adjust the brightness of an area of the display panel 414 corresponding to the antenna pattern 901 and/or the dummy pattern 902.

Referring to FIG. 9A, the display panel 414 according to an embodiment may include a first area corresponding to the antenna pattern 901 and a second area excluding the first area. According to an embodiment, the at least one processor may control the brightness of the first area to be a first brightness in order to prevent a decrease in brightness due to the antenna pattern 901. According to an embodiment, the at least one processor may control the brightness of the second area to be second brightness. For example, the first brightness may have a greater value than the second brightness. According to an embodiment, a brightness value may change consecutively at a boundary between the first area and the second area.

Referring to FIG. 9B, according to an embodiment, the display panel 414 may include a first area corresponding to the antenna pattern 901, a second area corresponding to the dummy pattern 902, and a third area excluding the first area and the second area. According to an embodiment, the at least one processor may adjust the brightness of the first area, the second area, or the third area in order to prevent a decrease in brightness due to the antenna pattern 901 and the dummy pattern 902. According to an embodiment, the at least one processor may control the brightness of the first area to be the first brightness. According to an embodiment, the at least one processor may control the brightness of the second area to be a second brightness. According to an embodiment, the at least one processor may control the brightness of the third area to be a third brightness. According to an embodiment, the at least one processor may control the display panel 414 to change the brightness of the display panel 414 from the first brightness to the third brightness in the second area of the display panel 414. For example, the brightness value of the display panel 414 may gradually change from the first brightness to the third brightness through the second area.

Figure 10:
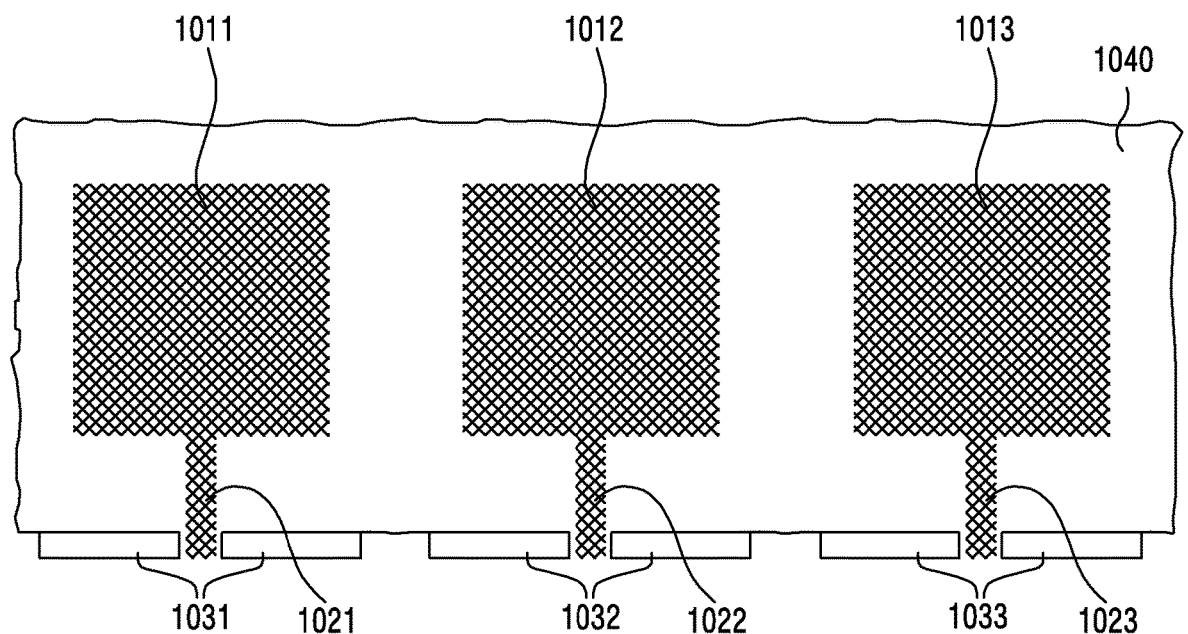
FIG. 10 illustrates an antenna structure including a plurality of antenna patterns and a dummy pattern according to an embodiment.

FIG. 10 illustrates an antenna structure including a plurality of antenna patterns and a dummy pattern according to an embodiment.

Referring to FIG. 10, an antenna structure according to an embodiment may include a plurality of antenna patterns 1010, a dummy pattern 1040, a ground portion 1030, and a power feed line 1020. The plurality of antenna patterns 1010 according to an embodiment may include a first antenna pattern 1011 (e.g., the antenna pattern 610 of FIG. 6), a second antenna pattern 1012 (e.g., the antenna pattern 610 of FIG. 6), and/or a third antenna pattern 1013 (e.g., the antenna pattern 610 of FIG. 6). The same reference numerals are used for substantially the same components, and redundant descriptions will be omitted.

Referring to FIGS. 4 and 10 together, the plurality of antenna patterns 1010 and the dummy pattern 1040 may be disposed on the first layer 413. The plurality of antenna patterns 1010 according to an embodiment may be spaced apart from each other. According to an embodiment, the plurality of antenna patterns 1010 may be arranged at regular intervals. For example, the first antenna pattern 1011, the second antenna pattern 1012, and/or the third antenna pattern 1013 may form a single array antenna.

According to an embodiment, the dummy pattern 1040 may be disposed in some of areas of the first layer 413 that do not correspond to the plurality of antenna patterns 1010. For example, the dummy pattern 1040 may be disposed in an area surrounding the plurality of antenna patterns 1010. For example, the dummy pattern 1040 may be disposed in an area between the first antenna pattern 1011 and the second antenna pattern 1012, and/or an area between the second pattern 1012 and the third antenna pattern 1013. According to an embodiment, the dummy pattern 1040 may be spaced apart from the plurality of antenna patterns 1010. According to an embodiment, the dummy pattern 1040 may be spaced apart from the plurality of antenna patterns 1010, the power feed line 1020, and the ground portion 1030.

According to an embodiment, at least a portion of the outline of the dummy pattern 1040 may have an irregular shape. According to an embodiment, at least a portion of the outline of the dummy pattern 1040 that is not adjacent to the plurality of antenna patterns 1010 may have an irregular shape.

According to an embodiment, the dummy pattern 1040 may have a first aperture ratio and a second aperture ratio greater than the first aperture ratio depending on the area thereof, for which reference may be made to FIG. 8.

According to an embodiment, the antenna structure may include a plurality of power feed lines 1020 and a plurality of ground portions 1031, 1032, and 1033. According to an embodiment, each of the plurality of power feed lines 1020 may be electrically connected to the plurality of antenna patterns 1010. For example, a first power feed line 1021 may extend from one end of the first layer 413 and may be electrically connected to the first antenna pattern 1011. A second power feed line 1022 may extend from one end of the first layer 413 and may be electrically connected to the second antenna pattern 1012. A third power feed line 1023 may extend from one end of the first layer 413 and may be electrically connected to the third antenna pattern 1013. According to an embodiment, a wireless communication circuit (e.g., the wireless communication module 1492 of FIG. 14) may feed power to each of the antenna patterns 1011, 1012, and 1013 via the plurality of power feed lines 1020. According to an embodiment, each of the antenna patterns 1011, 1012, and 1013 may be electrically connected to a ground through the plurality of ground portions 1031, 1032, and 1033, respectively.

Figure 11:
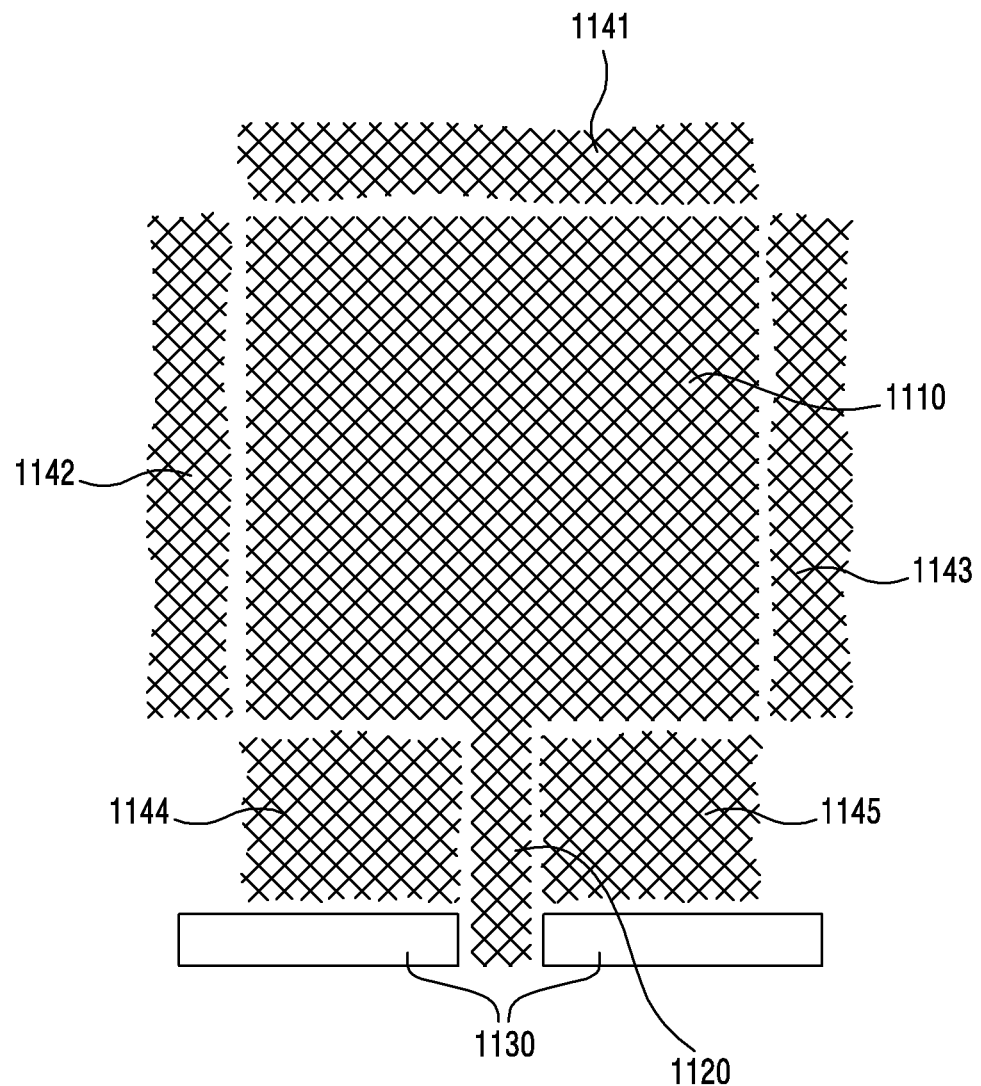
FIG. 11 illustrates an antenna structure including dummy patterns disposed in a parasitic pattern according to an embodiment.

FIG. 11 illustrates an antenna structure including dummy patterns disposed in a parasitic pattern according to an embodiment.

Referring to FIG. 11, an antenna structure according to an embodiment may include an antenna pattern 1110 (e.g., the antenna pattern 610 of FIG. 6), a plurality of dummy patterns 1140 (e.g., the dummy pattern 640 of FIG. 6), a power feed line 1120 (e.g., the power feed line 620 of FIG. 6), and a ground portion 1130 (e.g., the ground portion 630 of FIG. 6). The same reference numerals are used for substantially the same components, and redundant descriptions will be omitted.

According to an embodiment, the plurality of dummy patterns 1140 may be disposed in an area surrounding the antenna pattern 1110 (i.e., in a rectangular arrangement surrounding sides of the antenna pattern 1110). According to an embodiment, the plurality of dummy patterns 1140 may be disposed to surround the antenna pattern 1110. According to an embodiment, the antenna pattern 1110 may include a rectangular shape. However, the shape of the antenna pattern 1110 may not be limited thereto. According to an embodiment, the plurality of dummy patterns 1140 may be disposed at positions corresponding to edges of the antenna pattern 1110. According to an embodiment, the plurality of dummy patterns 1140 may be spaced apart from the antenna pattern 1110. According to an embodiment, a fourth dummy pattern 1144 and a fifth dummy pattern 1145 may be disposed in the area between the antenna pattern 1110 and the ground portion 1130 to be spaced apart from the antenna pattern 1110, the power feed line 1120, and the ground portion 1130.

According to an embodiment, the plurality of dummy patterns 1140 may include a conductive pattern. According to an embodiment, the plurality of dummy patterns 1140 may include a pattern that is the same as or similar to the antenna pattern 1110. For example, the plurality of dummy patterns 1140 may include a rhombic metal mesh pattern, but is not limited thereto. According to an embodiment, at least some of the plurality of dummy patterns 1141, 1142, 1143, 1144, and 1145 may include irregularly shaped outlines. For example, at least a portion of the outline of the first dummy pattern 1141 may include an irregular shape.

According to an embodiment, the plurality of dummy patterns 1140 may have different aperture ratios. For example, the first dummy pattern 1141 may have a first aperture ratio, and the second dummy pattern 1142 may have a second aperture ratio greater than the first aperture ratio. According to another embodiment, the plurality of dummy patterns 1140 may include various aperture ratios in their respective areas, for which reference may be made to FIG. 8.

Figure 12:
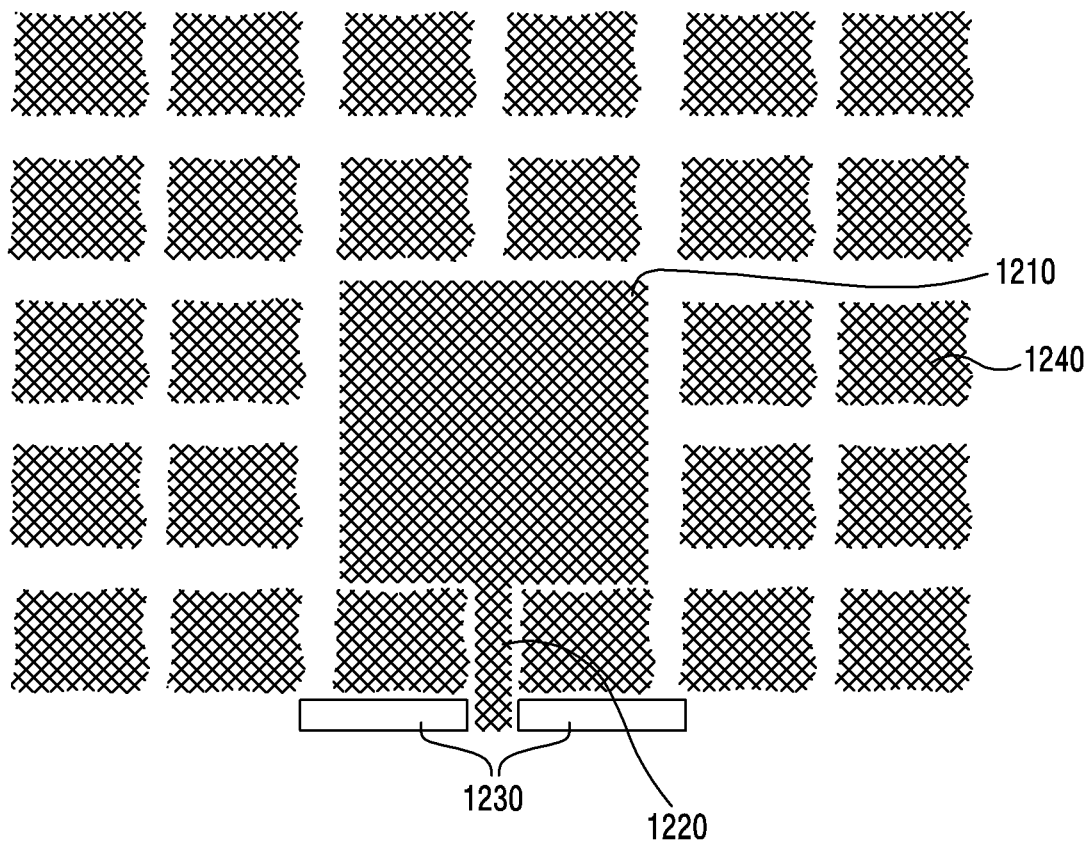
FIG. 12 illustrates an antenna structure including periodically disposed dummy patterns according to an embodiment.

FIG. 12 illustrates an antenna structure including periodically disposed dummy patterns according to an embodiment.

Referring to FIG. 12, an antenna structure according to an embodiment may include an antenna pattern 1210, a power feed line 1220, a plurality of dummy patterns 1240, and a ground portion 1230. The same reference numerals are used for substantially the same components, and redundant descriptions will be omitted.

According to an embodiment, the plurality of dummy patterns 1240 may be disposed in an area surrounding the antenna pattern 1210. According to an embodiment, the plurality of dummy patterns 1240 may be spaced apart from the antenna pattern 1210. According to an embodiment, the plurality of dummy patterns 1240 may be spaced apart from each other. According to an embodiment, the plurality of dummy patterns 1240 may be arranged at regular intervals. According to an embodiment, the plurality of dummy patterns 1240 may be arranged at various intervals. According to an embodiment, at least some of the plurality of dummy patterns 1240 may be disposed in the area between the antenna pattern 1210 and the ground portion 1230 to be spaced apart from the antenna pattern 1210, the power feed line 1220, and the ground portion 1230.

According to an embodiment, at least some of the plurality of dummy patterns 1240 may have substantially the same area as each other, but are not limited thereto. According to an embodiment, the plurality of dummy patterns 1240 may have various shapes. According to an embodiment, at least some of the plurality of dummy patterns 1240 may include irregularly shaped outlines. For example, at least a portion of the outline of one dummy pattern among the plurality of dummy patterns 1240 may have an irregular shape. According to an embodiment, the plurality of dummy patterns 1240 may include a conductive pattern. According to an embodiment, the plurality of dummy patterns 1240 may include a pattern that is the same as or similar to the antenna pattern 1210. For example, the plurality of dummy patterns 1240 may include a rhombic metal mesh pattern, but is not limited thereto.

Figure 13:
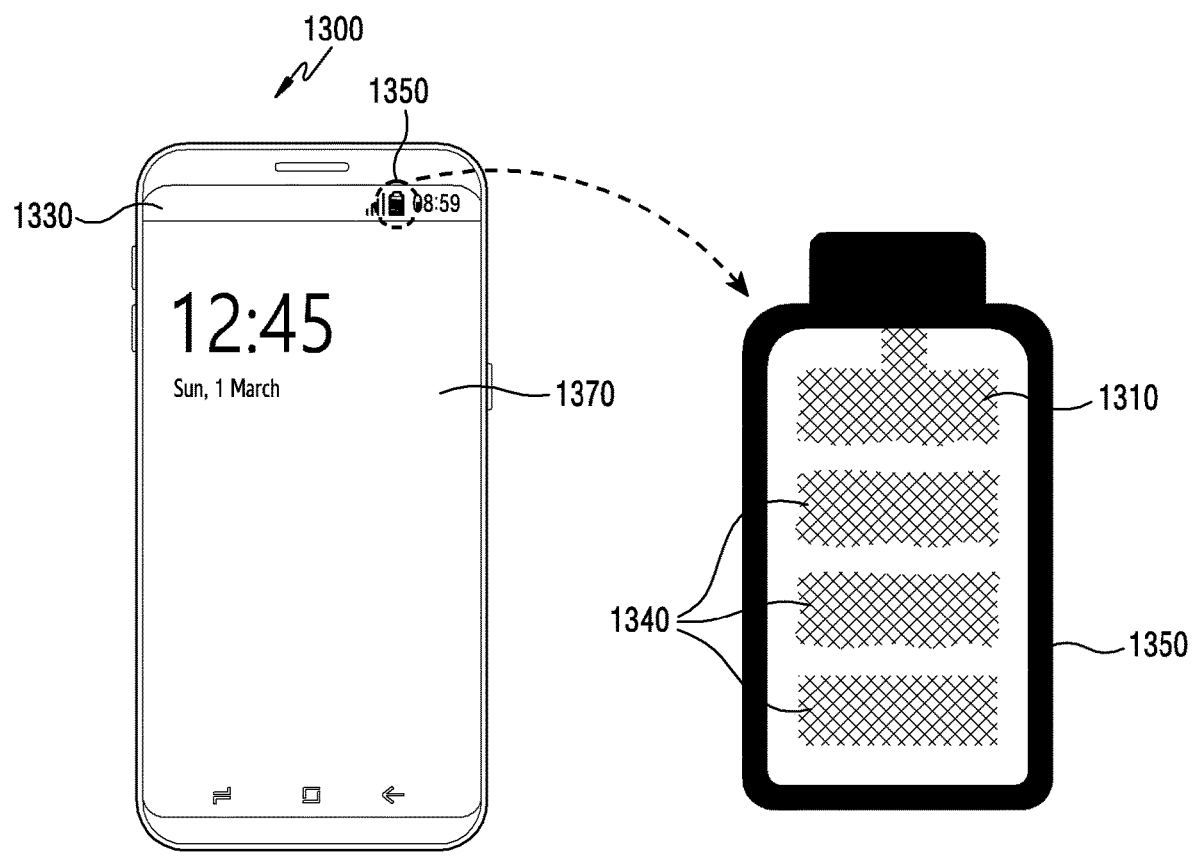
FIG. 13 illustrates an antenna pattern and dummy patterns included within a graphic user interface (GUI) according to an embodiment.

FIG. 13 illustrates an antenna pattern and dummy patterns included within a graphic user interface (GUI) according to an embodiment.

Referring to FIG. 13, an electronic device 1300 according to an embodiment may include a display 1370. The display 1370 according to an embodiment may include a top bar 1330 including a graphic user interface (GUI) on top of the display 1370. The GUI according to an embodiment may include icons 1350 (e.g., displaying a clock or a state of a battery or a communication state). According to an embodiment, the antenna pattern 1310 and one or more dummy patterns 1340 may be disposed in an area corresponding to an icon 1350. According to an embodiment, the antenna pattern 1310 and the one or more dummy patterns 1340 may be disposed in at least a partial area of the inner area of the icon 1350. For example, each of the antenna pattern 1310 and the one or more dummy patterns 1340 may be disposed in an area corresponding to a battery indication included in the icon 1350.

According to an embodiment, the antenna pattern 1310 and the one or more dummy patterns 1340 may be spaced apart from each other. According to an embodiment, the outlines of the at least one dummy pattern 1340 may at least partially have an irregular shape.

According to an embodiment, the one or more dummy patterns 1340 may have different aperture ratios, respectively. According to another embodiment, the one or more dummy patterns 1340 may include various aperture ratios in respective areas, for which reference may made to FIG. 8.

Figure 14:
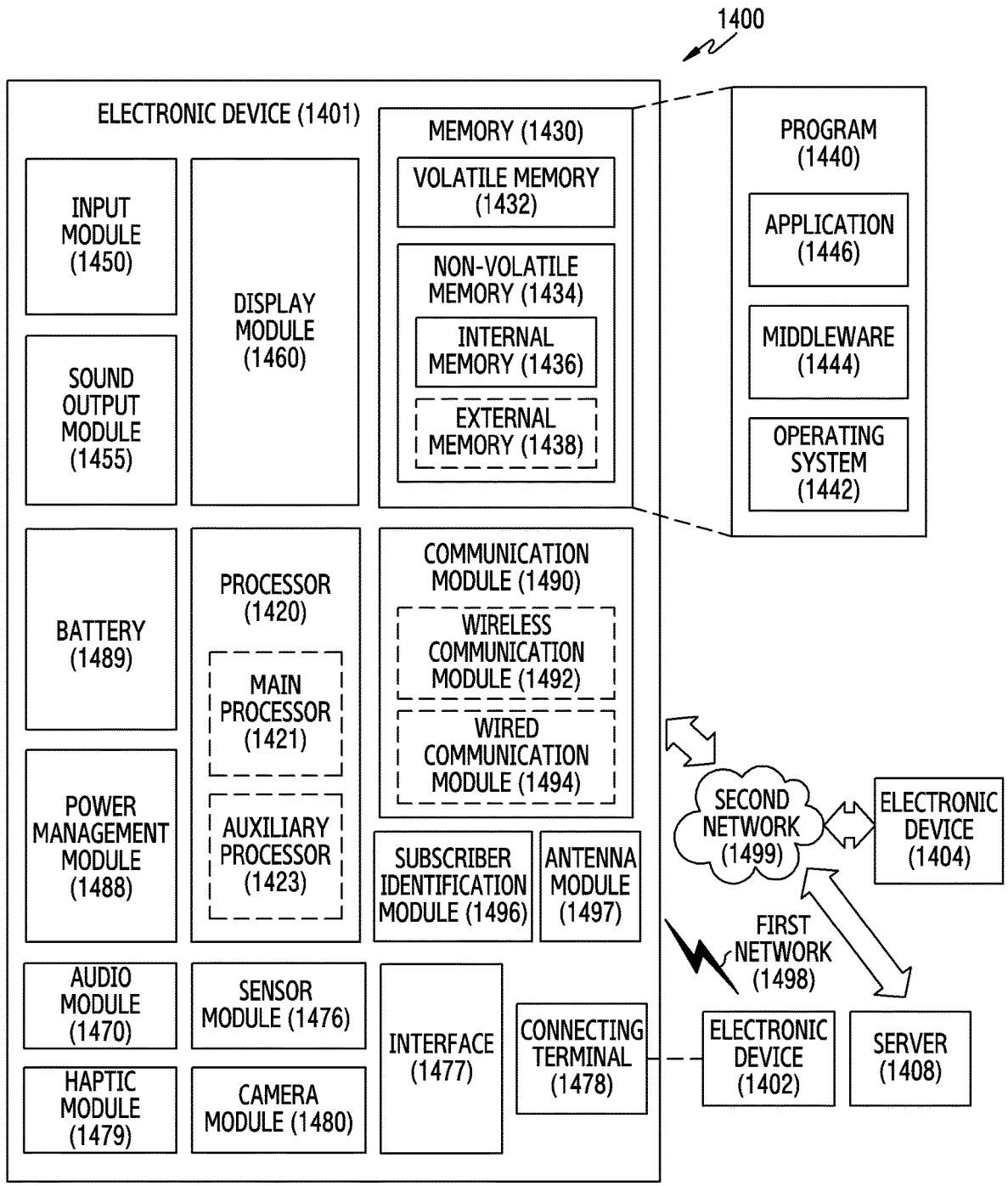
FIG. 14 is a block diagram of an electronic device according to various embodiments in a network environment.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor

1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401.

The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™ wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to an embodiment may include a display including a plurality of layers, a conductive mesh pattern disposed on a first layer among the plurality of layers and adjacent to a first edge of the display, a power feed line connected to the conductive mesh pattern at the first edge, and a wireless communication circuit electrically connected to the power feed line and configured to feed power to the conductive mesh pattern via the power feed line. In a first area between the conductive mesh pattern and the first edge among areas surrounding the conductive mesh pattern, the first layer may include a dummy pattern spaced apart from the conductive mesh pattern and the power feed line, and in a second area excluding the first area among the areas surrounding the conductive mesh pattern, the first layer may not include a conductive pattern.

According to an embodiment, the conductive mesh pattern may be configured to transmit or receive a mmWave signal.

According to an embodiment, the mmWave signal may include at least one frequency band of 28 GHz and 39 GHz.

An electronic device according to an embodiment may include a display panel disposed on a second layer among the plurality of layers, and a processor electrically connected to the display panel, and the processor may be configured to control the display panel to adjust brightness of the display panel.

The processor of an electronic device according to an embodiment may be configured to configure brightness of areas corresponding to the conductive mesh pattern and the dummy pattern in the display panel to first brightness, and to adjust brightness of an area corresponding to the second area in the display panel to second brightness having a lower value than the first brightness.

According to an embodiment, at least a portion of the outline of the dummy pattern may have an irregular pattern.

According to an embodiment, the first layer may include a ground, and the wireless communication circuit may be electrically connected to the ground.

An electronic device according to an embodiment may include a display including a plurality of layers, a conductive mesh pattern disposed on a first layer among the plurality of layers and provided inside a first edge of the display, a power feed line connected to the conductive mesh pattern at the first edge, and a wireless communication circuit electrically connected to the power feed line and configured to feed power to the conductive mesh pattern via the power feed line. The first layer may include a dummy pattern surrounding the conductive mesh pattern and the power feed line and spaced apart from the conductive mesh pattern and the power feed line. The dummy pattern may have a first aperture ratio in a first area adjacent to the conductive mesh pattern, and a second aperture ratio, which is higher than the first aperture ratio, in a second area spaced farther away from the conductive mesh pattern than the first area.

According to an embodiment, the dummy pattern may include a mesh having a size that increases as the dummy pattern is farther away from the conductive mesh pattern.

According to an embodiment, the dummy pattern may include a mesh line having a line width that decreases as the dummy pattern is farther away from the conductive mesh pattern.

According to an embodiment, a second layer among the plurality of layers may include a display panel and a processor electrically connected to the display panel, and the processor may be configured to adjust brightness of the display panel.

According to an embodiment, the processor may be configured to configure brightness of an area corresponding to the conductive mesh pattern in the display panel to first brightness, to adjust a brightness of an area corresponding to the first area in the display panel to second brightness, which has a lower value than the first brightness, and to adjust a brightness of an area corresponding to the second area in the display panel to third brightness which is lower than the second brightness.

According to an embodiment, at least a portion of the outline of the second area of the dummy pattern may have an irregular pattern.

According to an embodiment, the conductive mesh pattern may be configured to transmit or receive a mmWave signal.

According to an embodiment, the mmWave signal may include at least one frequency band of 28 GHz and 39 GHz.

An electronic device according to an embodiment may include a display including a plurality of layers, one or more conductive mesh patterns disposed on a first layer among the plurality of layers and inside a first edge of the display, at least one power feed line connected to the one or more conductive mesh patterns at the first edge, a wireless communication circuit electrically connected to the power feed line and configured to feed power to the conductive mesh patterns via the power feed line, and one or more dummy patterns surrounding the one or more conductive mesh patterns and the at least one power feed line and spaced apart from the conductive mesh patterns and the power feed line. At least a portion of the outline of the dummy pattern may have an irregular pattern.

According to an embodiment, the one or more conductive mesh patterns may have the same shape and may be spaced apart from each other at regular intervals.

According to an embodiment, the dummy patterns may be disposed to surround the one or more conductive patterns.

According to an embodiment, the one or more dummy patterns may have the same shape and may be spaced apart from each other at regular intervals.

According to an embodiment, the one or more dummy patterns may be disposed in a third area adjacent to the conductive mesh pattern among areas surrounding the conductive mesh patterns.

The invention claimed is:

1. An electronic device comprising:
   a display comprising a plurality of layers, the plurality of layers comprising a first layer and the first layer comprising a conductive mesh pattern disposed thereon and adjacent to a first edge of the display;
   a power feed line connected to the conductive mesh pattern at the first edge; and
   a wireless communication circuit electrically connected to the power feed line and configured to feed power to the conductive mesh pattern via the power feed line,
   wherein, in a first area between the conductive mesh pattern and the first edge among areas surrounding the conductive mesh pattern, the first layer comprises a dummy pattern spaced apart from the conductive mesh pattern and the power feed line, and, in a second area excluding the first area among the areas surrounding the conductive mesh pattern, the first layer does not comprise a conductive mesh pattern.

2. The electronic device of claim 1, wherein the conductive mesh pattern is configured to transmit/receive a mmWave signal corresponding to at least one frequency band of about 28 GHz and about 39 GHz.

3. The electronic device of claim 1, wherein the plurality of layers further comprises a second layer and the second layer comprises a display panel disposed thereon, the electronic device further comprising:
   a processor electrically connected to the display panel and configured to control the display panel to adjust a brightness thereof.

4. The electronic device of claim 3, wherein the processor is configured to:
   configure a brightness of areas corresponding to the conductive mesh pattern and the dummy pattern in the display panel to a first brightness; and
   adjust a brightness of an area corresponding to the second area in the display panel to a second brightness having a lower value than the first brightness.

5. The electronic device of claim 1, wherein at least a portion of an outline of the dummy pattern has an irregular pattern.

6. The electronic device of claim 1, wherein the first layer further comprises a ground, and
   the wireless communication circuit is electrically connected to the ground.

7. The electronic device of claim 1, wherein a portion of the conductive mesh pattern is self-similar.

8. The electronic device of claim 1, wherein the conductive mesh pattern is provided on the first layer inside the first edge.

9. The electronic device of claim 8, wherein the dummy pattern comprises:
   a first aperture ratio in a third area adjacent to the conductive mesh pattern; and
   a second aperture ratio, which is higher than the first aperture ratio, in a fourth area spaced farther away from the conductive mesh pattern than the third area.

10. The electronic device of claim 9, wherein the dummy pattern comprises at least one of:

a mesh having a size that increases as the dummy pattern is farther away from the conductive mesh pattern; and a mesh line having a line width that decreases as the dummy pattern is farther away from the conductive mesh pattern.

11. The electronic device of claim 9, wherein the plurality of layers further comprises a second layer and the second layer comprises a display panel and a processor electrically connected to the display panel and configured to adjust a brightness of the display panel based on an aperture ratio of the dummy pattern and/or the conductive mesh pattern.

12. The electronic device of claim 11, wherein the processor is configured to:

configure a brightness of an area corresponding to the conductive mesh pattern in the display panel to a first brightness;

adjust a brightness of an area corresponding to the third area in the display panel to a second brightness having a lower value than the first brightness; and adjust a brightness of an area corresponding to the fourth area in the display panel to a third brightness having a lower value than the second brightness.

13. The electronic device of claim 9, wherein at least a portion of an outline of the fourth area of the dummy pattern has an irregular pattern.

14. The electronic device of claim 2, wherein the wireless communication circuit is configured to transmit and/or receive the signal toward the front surface of the electronic device via the conductive mesh pattern.

15. A display of an electronic device comprising:

a first edge;

a first layer adjacent to the first edge and comprising a conductive mesh pattern disposed thereon, a first area between the conductive mesh pattern and the first edge in which a dummy pattern is spaced apart from the conductive mesh pattern and a power feed line and a second area; and a second layer comprising a display panel; and a processor configured to configure a brightness of areas corresponding to the conductive mesh pattern and the dummy pattern to a first brightness and adjust a brightness of the second area to a second brightness having a lower value than the first brightness.

16. The electronic device of claim 15, wherein the conductive mesh pattern is configured to transmit/receive a mmWave signal corresponding to at least one frequency band of about 28 GHz and about 39 GHz.

17. The electronic device of claim 15, wherein at least a portion of an outline of the dummy pattern has an irregular pattern.

18. The electronic device of claim 15, wherein the dummy pattern comprises:

a first aperture ratio in a third area adjacent to the conductive mesh pattern; and a second aperture ratio, which is higher than the first aperture ratio, in a fourth area spaced farther away from the conductive mesh pattern than the third area.

19. The electronic device of claim 15, wherein the dummy pattern comprises at least one of:

a mesh having a size that increases as the dummy pattern is farther away from the conductive mesh pattern; and a mesh line having a line width that decreases as the dummy pattern is farther away from the conductive mesh pattern.

20. A method of operating a display of an electronic device comprising a first layer adjacent to a first edge and comprising a conductive mesh pattern disposed thereon, a first area between the conductive mesh pattern and the first edge in which a dummy pattern is spaced apart from the conductive mesh pattern and a power feed line, a second area and a second layer comprising a display panel, the method comprising:

configuring a brightness of areas corresponding to the conductive mesh pattern and the dummy pattern to a first brightness; and adjusting a brightness of the second area to a second brightness having a lower value than the first brightness.

* * * * *